(12) United States Patent
Ponti et al.

(10) Patent No.: US 10,793,300 B2
(45) Date of Patent: Oct. 6, 2020

(54) SYSTEM AND METHOD FOR FORMING A CUSTOM-SIZED PACKAGE

(71) Applicant: Lorenzo Ponti, Cerbara-Citta' di Castello (IT)

(72) Inventors: Lorenzo Ponti, Cerbara-Citta' di Castello (IT); Giuseppe Ponti, Cerbara-Citta' di Castello (IT)

(73) Assignee: Lorenzo Ponti, Cerbara-Citta'Di (IT)

( * ) Notice: Subject to any disclaimer, the term of this patent is extended or adjusted under 35 U.S.C. 154(b) by 265 days.

(21) Appl. No.: 15/561,840

(22) PCT Filed: Mar. 30, 2016

(86) PCT No.: PCT/IB2016/051788
§ 371 (c)(1),
(2) Date: Sep. 26, 2017

(87) PCT Pub. No.: WO2016/157089
PCT Pub. Date: Oct. 6, 2016

(65) Prior Publication Data
US 2018/0134421 A1 May 17, 2018

(30) Foreign Application Priority Data

Apr. 1, 2015 (IT) .......................... 102015000010553

(51) Int. Cl.
*B65B 5/02* (2006.01)
*B65B 43/10* (2006.01)
(Continued)

(52) U.S. Cl.
CPC ................ *B65B 5/024* (2013.01); *B65B 5/06* (2013.01); *B65B 43/10* (2013.01); *B65B 49/02* (2013.01);
(Continued)

(58) Field of Classification Search
CPC .... B65B 5/02; B65B 5/06; B65B 5/08; B65B 11/00; B65B 11/06; B65B 43/08;
(Continued)

(56) References Cited

U.S. PATENT DOCUMENTS 3,163,095 A * 12/1964 Sheeran .................. B31B 50/00
493/352
3,738,480 A * 6/1973 Chesley ............. B65D 83/0445
206/534

(Continued)

FOREIGN PATENT DOCUMENTS

EP         2805892 A1    11/2014
WO    WO 2014/033635 A1   3/2014
(Continued)

*Primary Examiner* — Hemant Desai
*Assistant Examiner* — Jacob A Smith
(74) *Attorney, Agent, or Firm* — R. Neil Sudol; Henry D. Coleman

(57) ABSTRACT

A method and an apparatus (10) for realising a box (9) starting from a cardboard band (7) for packing a plurality of articles (100) with the box (9), wherein the plurality of articles (100) is contained in a reusable crate (1), the first internal wall (4) of which is positioned such as to minimise the volume of the chamber (5) containing the plurality of articles (100). The apparatus comprises: detecting means (11) arranged so as to detect data on the volume occupied by the plurality of articles (100); cutting means (12) for cutting a cardboard band (7) and obtaining a portion of cardboard band (8) in a flat configuration; a control unit which receives the data from the detecting means (11) and which commands the cutting means (12); movement means (13) for moving the bottom wall (2) of the crate (1); positioning means (14) for reciprocally positioning the portion of cardboard band (8) and the crate (1) such that the portion of cardboard band (8) can receive the plurality of articles (100); folding means
(Continued)

(15) for folding the portion of cardboard band (8) in a flat configuration so as to form a box (9).

2 Claims, 6 Drawing Sheets

(51) Int. Cl.
*B65B 49/02* (2006.01)
*B65B 5/06* (2006.01)
*B65B 57/10* (2006.01)
*B65B 59/02* (2006.01)
*B65D 25/06* (2006.01)
*B65D 25/38* (2006.01)
*B65D 43/20* (2006.01)
*B65D 5/49* (2006.01)
*B65B 59/00* (2006.01)

(52) U.S. Cl.
CPC .......... *B65B 57/10* (2013.01); *B65D 5/48024* (2013.01); *B65D 25/06* (2013.01); *B65D 25/38* (2013.01); *B65D 43/20* (2013.01); *B65B 59/003* (2019.05); *B65B 2210/04* (2013.01); *B65D 2231/005* (2013.01); *Y02W 30/807* (2015.05)

(58) Field of Classification Search
CPC ......... B65B 49/00; B65B 57/10; B65B 59/00; B65B 59/02; B65D 25/06; B65D 43/20; B65D 25/38
USPC .... 220/529, 543, 551; 53/52, 176, 456, 458, 53/503, 563, 564
See application file for complete search history.

(56) References Cited

U.S. PATENT DOCUMENTS

| | | | | |
|---|---|---|---|---|
| 3,948,022 | A * | 4/1976 | Minaka | B65B 5/02 53/156 |
| 4,306,399 | A * | 12/1981 | Tsujimoto | B65B 43/30 53/385.1 |
| 5,239,807 | A * | 8/1993 | Soleri | B65B 5/061 53/244 |
| 5,791,292 | A * | 8/1998 | Jempolsky | A01M 23/20 119/482 |
| 5,810,487 | A * | 9/1998 | Kano | B41J 3/28 400/83 |
| 6,073,794 | A * | 6/2000 | Bidot | A47B 88/994 220/529 |
| 2003/0233816 | A1* | 12/2003 | Klapp | B65B 25/143 53/542 |
| 2008/0000397 | A1* | 1/2008 | Dickinson | B65D 19/20 108/55.3 |
| 2008/0020916 | A1 | 1/2008 | Magnell | |
| 2009/0031676 | A1* | 2/2009 | Boigues | B65B 59/001 53/491 |
| 2009/0045708 | A1* | 2/2009 | Dominique | A47B 88/00 312/301 |
| 2011/0023417 | A1* | 2/2011 | Finkowski | B65B 5/02 53/443 |
| 2011/0293397 | A1* | 12/2011 | Lomerson, Jr. | B65B 5/06 414/800 |
| 2013/0000252 | A1* | 1/2013 | Pettersson | B65B 5/024 53/396 |
| 2013/0221088 | A1 | 8/2013 | Magnell | |
| 2014/0199150 | A1* | 7/2014 | Razumov | B65B 5/08 414/752.1 |
| 2014/0260113 | A1* | 9/2014 | Thompson | B65B 35/58 53/475 |
| 2014/0298754 | A1* | 10/2014 | Van Wijngaarden | B65B 5/103 53/443 |
| 2014/0345235 | A1* | 11/2014 | Yamazaki | B65B 43/10 53/462 |
| 2015/0360801 | A1* | 12/2015 | Sytema | B65B 43/52 53/74 |

FOREIGN PATENT DOCUMENTS

| | | |
|---|---|---|
| WO | WO 2014/118594 A1 | 8/2014 |
| WO | WO 2014/118631 A1 | 8/2014 |
| WO | WO 2014/119439 A1 | 8/2014 |
| WO | WO 2015/113665 A1 | 8/2015 |

* cited by examiner

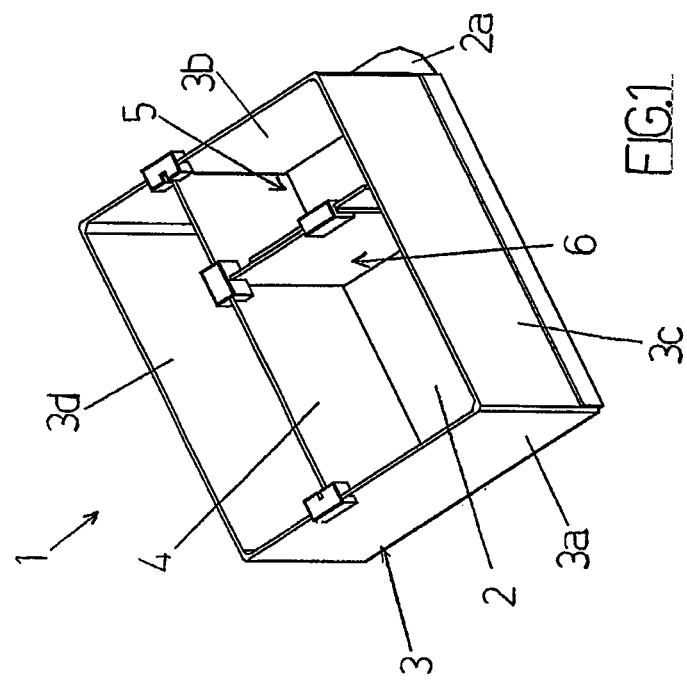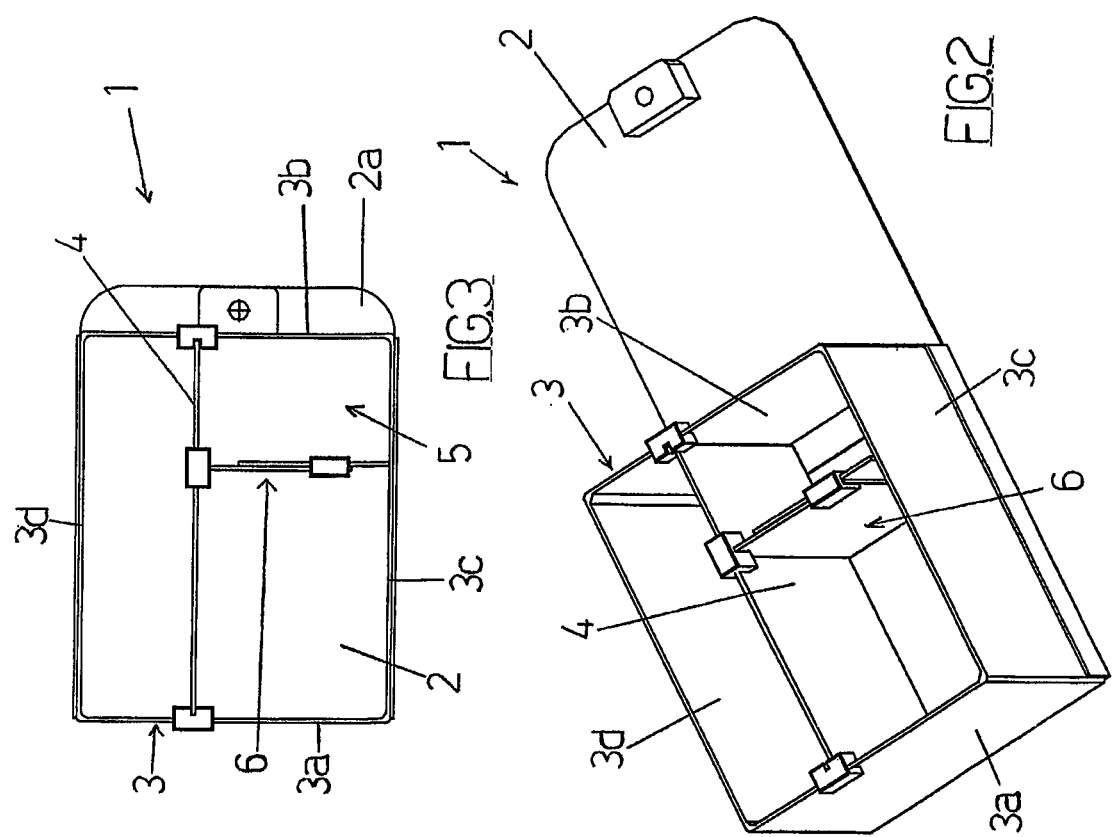

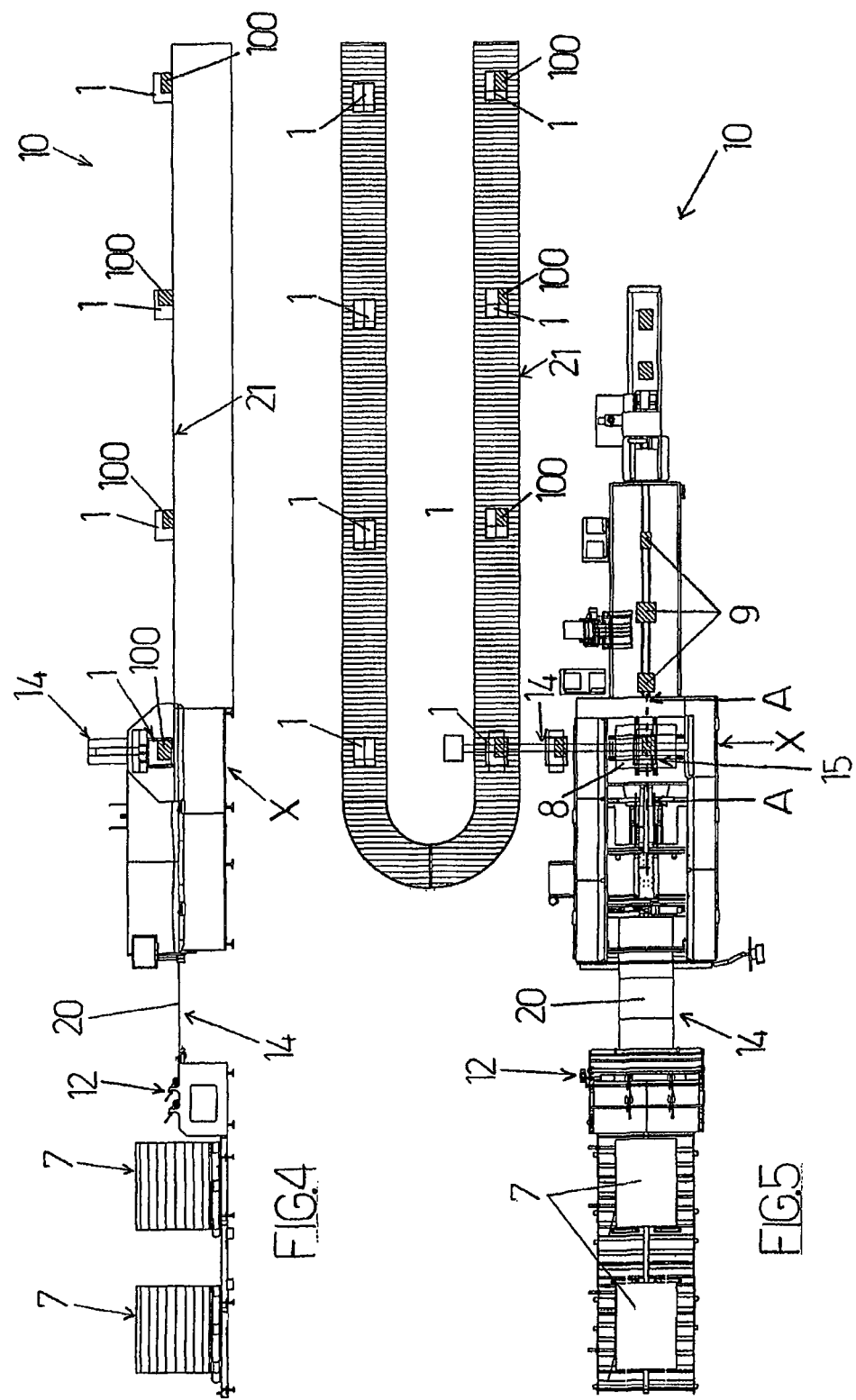

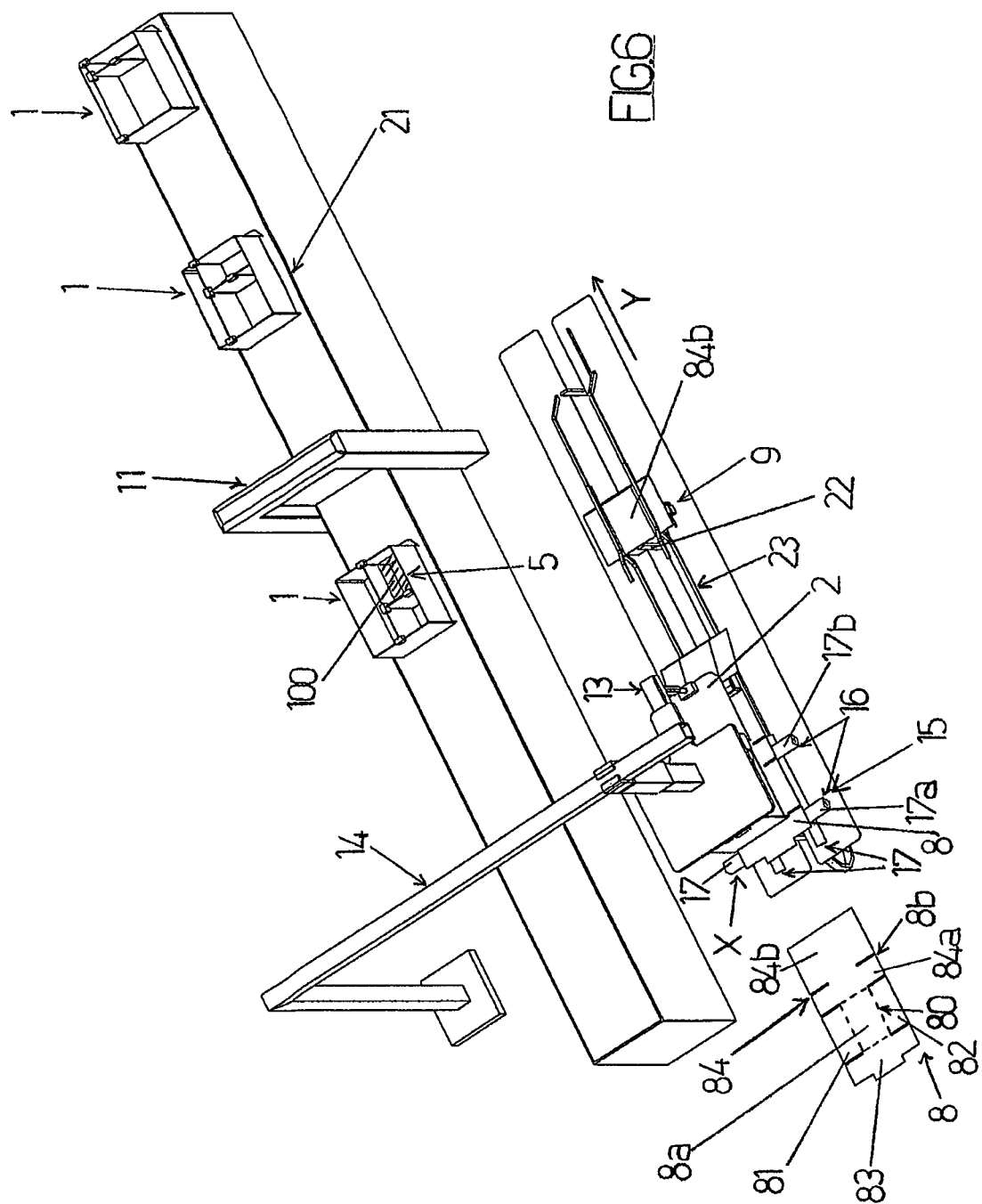

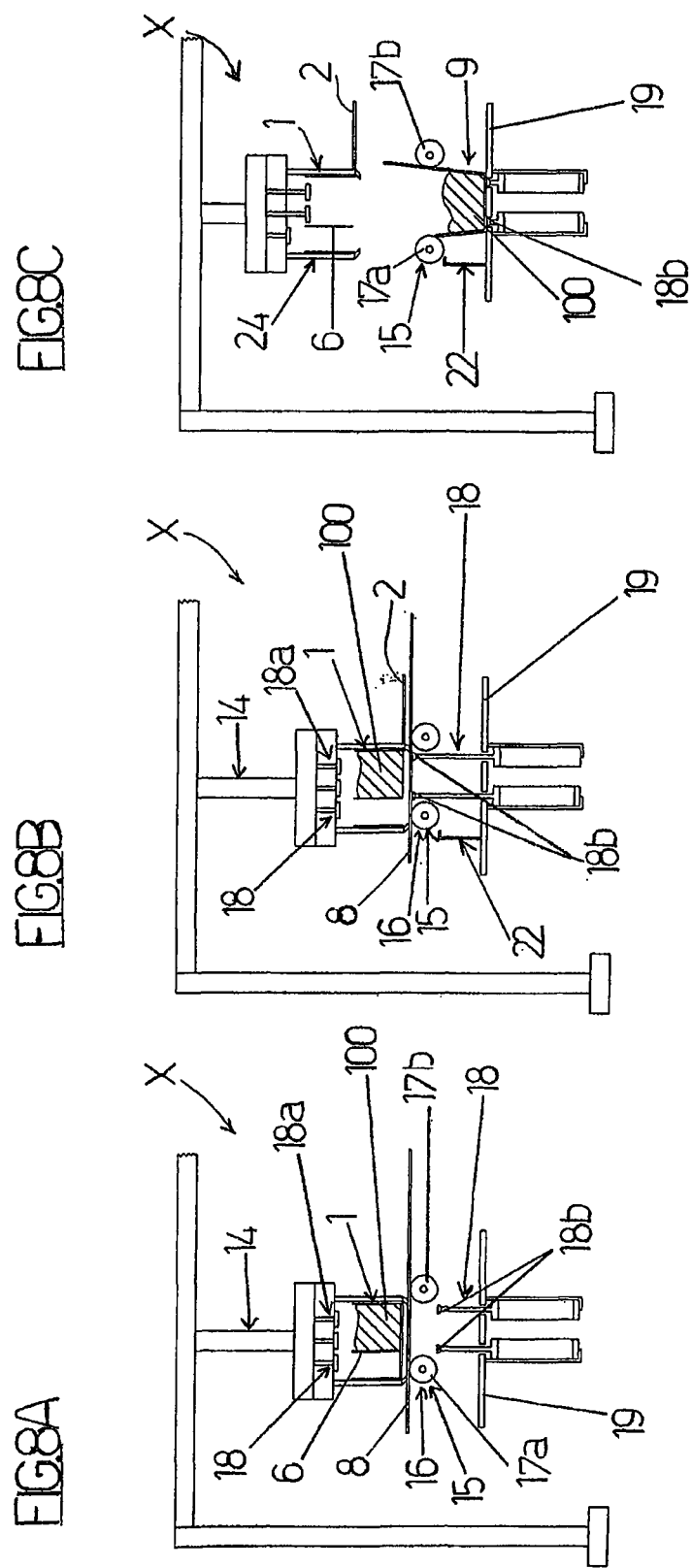

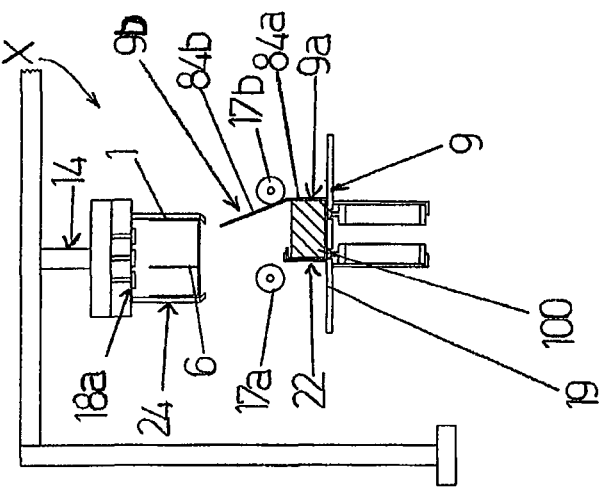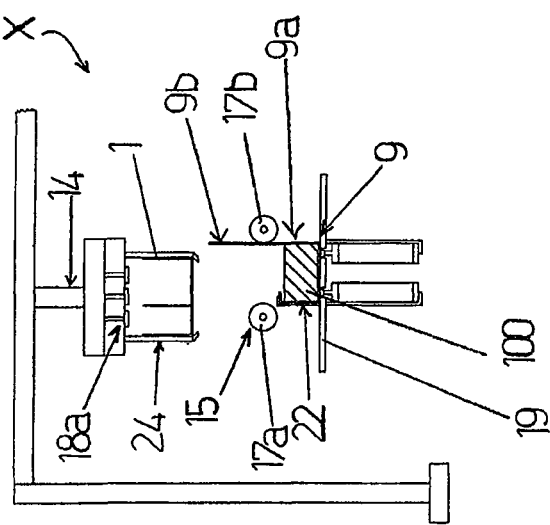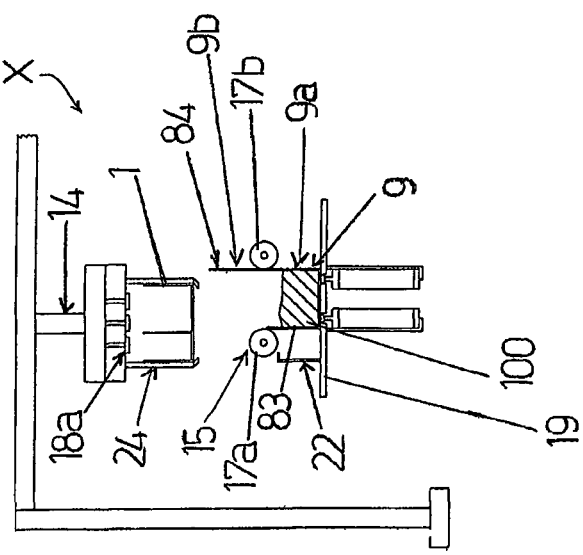

SYSTEM AND METHOD FOR FORMING A CUSTOM-SIZED PACKAGE

FIELD OF THE INVENTION

The present invention relates to the technical sector concerning packaging of a plurality of articles.

In particular the present invention relates to a method and an apparatus for realising a box starting from a cardboard band for packaging and for packing a plurality of articles with the box. The present invention relates to a reusable crate for containing the plurality of articles, which reusable crate is used in the above method and apparatus.

A packaging company usually receives orders relating to a plurality of articles, which are often different among themselves in terms of shape and dimensions.

DESCRIPTION OF THE PRIOR ART

At present, in order to pack a plurality of articles, a packaging company uses cardboard boxes for packaging having predetermined dimensions: the packaging company can decide to avail of cardboard boxes of different sizes (for example small, medium and large cardboard cartons).

To pack a plurality of articles an operator chooses the cardboard box of the most suitable measurement from among those available, inserts the plurality of articles in the cardboard box and fills the remaining space with filler material (for example polystyrene).

However, the use of cardboard boxes having predefined dimensions determines a waste of material. In particular, the waste is more the smaller the volume of the plurality of articles to be packed with respect to the volume of the cardboard box: in this case, there is a large waste of both cardboard for packaging and filler material.

It is further obvious how oversized cardboard boxes with respect to what is necessary complicate transport and consequently increase costs. In fact, given a fixed means of transport and the number of cardboard boxes to be transported, the larger the boxes the more journeys the means of transport will have to make.

SUMMARY OF THE INVENTION

In the light of the foregoing, the aim of the present invention consists in obviating the above-mentioned drawbacks.

The above aims are attained with a method and an apparatus according, respectively, to claims 6 and 9, which method and apparatus utilise a reusable crate according to claim 1.

The method and the apparatus of the invention advantageously do not utilise cardboard boxes for packaging having predefined dimensions but realise a box appropriately dimensioned according to the shape and dimensions of the plurality of articles to be packed.

The realising of the above-mentioned appropriately-dimensioned box is made possible by the use of the reusable crate. In fact, the reusable crate enables arranging the plurality of articles to be packed in a chamber the volume of which is minimised, as a function of the shape and dimensions of the plurality of articles to be packed, thanks to the mobility of the first internal wall of the reusable crate. This advantageously enables reducing packaging costs as the material used is minimised: both the quantity of cardboard for the packaging and the quantity of filler material are minimised. The reduction of the quantities of the materials not only reduces the packaging costs but also reduces the costs for elimination of the materials and the relative ecological impact.

Further, the costs relative to the transport of the boxes are modest, as the loads of the transport means will be optimised.

BRIEF DESCRIPTION OF THE DRAWINGS

Specific embodiments of the invention will be described in the following part of the present description, according to what is set out in the claims and with the aid of the appended tables of drawings, in which:

FIGS. 1, 2 and 3 illustrate, respectively, two perspective views and a view from above of a reusable crate that is the object of the present invention;

FIGS. 4 and 5 illustrate, respectively, two perspective views and a view from above of an embodiment of the apparatus of the present invention;

FIGS. 6 and 7 illustrate, in perspective view and in different operating steps, a part of the apparatus of FIG. 5;

FIGS. 8A-8F illustrate section A-A of a part of the boxing station of the apparatus of FIG. 5 in different operating steps.

DESCRIPTION OF THE PREFERRED EMBODIMENTS

Figure 7:
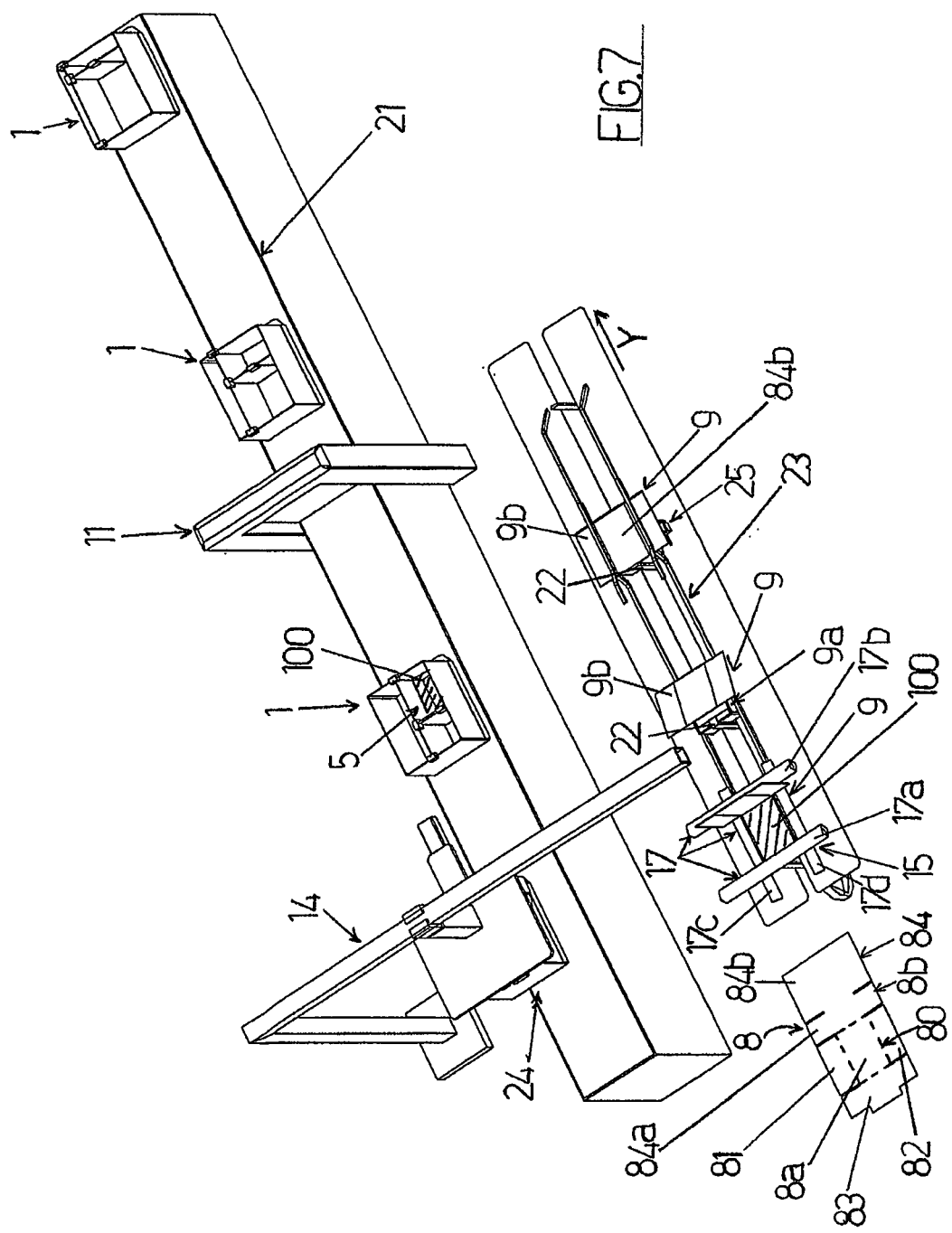

With reference to the accompanying tables of drawings, reference numeral (10) denotes the apparatus of the present invention and reference numeral (1) denotes the reusable crate used by the apparatus (10).

The reusable crate (1) comprises: a bottom wall (2) for receiving a plurality of articles (100); an external wall (3) which rises from the bottom wall (2); a first internal wall (4), which rises from the bottom wall (2). The first internal wall (4), a part of the bottom wall (2) and a part of the external wall (3) identify a chamber (5) for containing a plurality of articles (100) to be packed. The first internal wall (4) is mobile so as to vary the volume of the chamber (5); the bottom wall (2) is mobile so as to enable release of the plurality of the articles (100) to be packed.

The above-mentioned reusable crate (1) advantageously enables dimensioning the chamber (5) (i.e. minimising the volume) as a function of the shape and dimensions of the plurality of articles (100) to be packed and to release the plurality of articles (100) by exploiting the mobility of the bottom wall (2).

The bottom wall (2) can be conformed, for example, as a triangle or a rectangle or an ellipse. The bottom wall (2) is preferably rectangular (FIGS. 1-3).

The external wall (3) preferably emerges at the whole edge of the bottom wall (2). The external wall (3) can be made in a single body or can comprise a plurality of portions fixed to one another.

The bottom wall (2) can be constrained to slide along a part of a relative edge of the external wall (3). The bottom wall (2) can comprise a projection (2a) to facilitate the sliding thereof along the relative edge of the external wall (3).

The first internal wall (4) can be in a single body or can be telescopic.

The external wall (3) preferably comprises a first portion (3a) and a second portion (3b) opposite and parallel to one another. The first internal wall (4) is constrained, at two relative ends, to the first portion (3a) and to the second portion (3b) so as to slide in a parallel direction to the first portion (3a) and to the second portion (3b) (FIG. 3).

This embodiment of the reusable crate (1) advantageously enables varying the volume of the chamber (5) simply and rapidly.

The first internal wall (4) can be constrained to the first portion (3a) and to the second portion (3b) so as to be perpendicular to the first portion (3a) and to the second portion (3b) (FIGS. 1-3).

The reusable crate (1) preferably comprises a second internal wall (6) which rises from the bottom wall (2), which also identifies the chamber (5), and which is mobile so as to vary the volume of the chamber (5). The second internal wall (6) is constrained, at a relative end, to the first internal wall (4) for sliding along the first internal wall (4) (FIGS. 1-3). The reusable crate (1) advantageously enables high flexibility in the dimensioning of the volume of the chamber (5).

The second internal wall (6) can be constrained to the first internal wall (4) so as to extend perpendicularly to the first internal wall (4).

The external wall (3) preferably has a polygonally-conformed transversal section and comprises a third portion (3c) and a fourth portion (3d), opposite and parallel to one another, which third portion (3c) and fourth portion (3d) conjoin the first portion (3a) and the second portion (3b). The first internal wall (4) is parallel to the third portion (3c) and the fourth portion (3d) and the second internal wall (6) is parallel to the first portion (3c) and to the second portion (3d) (FIGS. 1-3). In this embodiment the chamber (5) has a parallelepiped-shaped volume.

The reusable crate (1) advantageously enables dimensioning the chamber (5) in an optimised manner for the packaging of the plurality of articles (100).

The third portion (3c) and the fourth portion (3d) are preferably perpendicular to the first portion (3a) and to the second portion (3b).

The first portion (3a), the second portion (3b), the third portion (3c) and the fourth portion (3d) are made in a single body (FIGS. 1-3). The bottom wall (2) is constrained to the external wall (3) so as to slide along an edge of the third portion (3c) and the fourth portion (3d).

The second internal wall (6) is preferably telescopic (FIGS. 1-3).

The method of the present invention, which uses the reusable crate (1) described in the foregoing, comprises steps of:
  arranging a plurality of articles (100) to be packed in a chamber (5) of a reusable crate (1) according to one of the above-described embodiments;
  positioning the first internal wall (4) of the reusable crate (1) such as to minimise the volume of the chamber (5) and, thereafter, detecting data on the volume occupied by the plurality of articles (100) to be packed;
  cutting a cardboard band (7) for packaging according to the data, obtaining a portion of cardboard band (8) in a flat configuration;
  reciprocally positioning the portion of cardboard band (8) and the reusable crate (1) such that the portion of cardboard band (8) can receive the plurality of articles (100) to be packed from the reusable crate (1);
  moving the bottom wall (2) of the reusable crate (1) so as to release the plurality of articles (100) to be packed on the portion of cardboard band (8);
  folding the portion of cardboard band (8) in a flat configuration so as to form a box (9).

The expression "volume occupied by the plurality of articles (100) to be packed" relates to a volume defined by a transversal section substantially equal to the transversal section of the chamber (5) of the reusable crate (1), when the first internal wall (4) is arranged such as to minimise the volume of the chamber (5), and a height that depends on the shape and dimensions of the plurality of articles (100) to be packed.

The steps of arranging a plurality of articles (100) to be packed in the chamber (5) of a reusable crate (1) and positioning the first internal wall (4) of the reusable crate (1) such as to minimise the volume of the chamber (5) can be carried out manually by an operator. The operator can further insert in the chamber (5) any filler material so as to fill the gaps between one article and another.

The step of moving the bottom wall (2) is carried out following the step of reciprocally positioning the portion of cardboard band (8) and the reusable crate (1) such that the portion of cardboard band (8) can receive the plurality of articles (100) to be packed from the reusable crate (1).

The folding step, on the other hand, can be carried out before the reciprocal positioning step of the portion of cardboard band (8) and the reusable crate (1) or after the step of moving the bottom wall (2).

In particular, in the case in which the folding step is carried out after the movement step of the bottom wall (2), the expression "portion of cardboard band (8)" is taken to mean the portion of cardboard band (8) in the flat configuration (see FIGS. 8A-8B). Alternatively, in a case where the folding step is carried out before the step of reciprocal positioning of the portion of cardboard band (8) and the reusable crate (1), the expression "portion of cardboard band (8)" is taken to mean the portion of cardboard band (8) conformed in a box-shape which, for the sake of simplicity, will be referred-to as the box (9) (embodiment not illustrated).

The portion of the cardboard band (8), in both the flat configuration (8) and in the box configuration (9), comprises a central region (8a) dimensioned for restingly receiving the plurality of articles (100) and a peripheral region (8b) which surrounds the central region (8a).

The step of folding the portion of cardboard band (8) in a flat configuration so as to form a box (9) preferably comprises:
  reciprocally arranging the portion of cardboard band (8) in a flat configuration and at least two folding elements (17) so that the portion of cardboard band (8) in the flat configuration is above the at least two folding elements (17);
  moving at least a folding element (17), according to the data detected on the volume occupied by the plurality of articles (100) to be packed, so that when the portion of cardboard band (8) in the flat configuration is drawn against the at least two folding elements (17), each of the at least two folding elements (17) encounters the peripheral region (8b) of the portion of cardboard band (8) in the flat configuration;
  drawing the portion of cardboard band (8) in a flat configuration against the at least two folding elements (17) so as to form the box (9).

The above-mentioned embodiment of the folding step is preferably carried out after the step of moving the bottom wall (2), in turn carried out following the reciprocal positioning step of the portion of cardboard band (8) and the reusable crate (1). The step of folding can advantageously be carried out at the same time as the release of the plurality of articles (100) from the reusable crate (1).

The step of folding the portion of cardboard band (8) in the flat configuration preferably comprises steps of: arranging an abutting plane (19) inferiorly to the at least two folding elements (17) so as to encounter the central region (8*a*) of the cardboard band (8); moving the abutting plane (19), according to the data detected on the volume occupied by the plurality of articles (100) to be packed, so as to vary a distance between the abutting plane (19) and the at least two folding elements (17). Further, the step of drawing the portion of cardboard band (8) in the flat configuration against the at least two folding elements (17) includes drawing the portion of cardboard band (8) in the flat configuration up to contacting the abutting plane (19) with the central region (8*a*) of the portion of cardboard band (8).

The above-described method, object of the present invention, can be actuated by the apparatus (10) that is also an object of the present invention.

As mentioned in the foregoing, the apparatus (10) of the present invention is an apparatus (10) for realising a box (9) starting from a cardboard band (7) and for packing a plurality of articles (100) with the box (9). The apparatus (10) of the invention cooperates with a reusable crate (1) as described in the foregoing. In fact, the plurality of articles (100) to be packed with the box (9) is contained in a reusable crate (1) in which the first internal wall (4) of the reusable crate (1) is positioned such as to minimise the volume of the chamber (5).

The apparatus (10) of the invention comprises: detecting means (11) arranged so as to detect data on the volume occupied by the plurality of articles (100) to be packed; cutting means in the form of blades or knives (12) for cutting a cardboard band (7) for packaging and obtaining a portion of cardboard band (8) in a flat configuration; a control unit (not illustrated) which receives the data from the detecting means (11) and which commands the cutting means (12) according to the data; movement means (13) including a gripper for entraining and moving the bottom wall (2) of the reusable crate (1); positioning means (14) for reciprocally positioning the portion of cardboard band (8) and the reusable crate (1) at a boxing station (X), such that the portion of cardboard band (8) can receive the plurality of articles (100) to be packed from the reusable crate (1); folding means (15) for folding the portion of cardboard band (8) in a flat configuration so as to form a box (9).

The movement means (13) can be activated at the boxing station (X).

The detecting means (11) are arranged so as to detect data on the volume occupied by the plurality of articles (100) in the moment when the first internal wall (4) of the reusable crate (1) has been positioned such as to minimise the volume of the chamber (5).

The detecting means (11) can comprise a tv camera. The tv camera detects images of the plurality of articles (100) to be packed in order to enable a relative software program to detect the volume thereof (this is, substantially, a volume having a transversal section equal to the transversal section of the chamber (5), and a height which depends on the shape and dimensions of the plurality of articles (100)). Once the volume occupied by the plurality of articles (100) to be packed is known, the control unit commands the cutting means (12) to cut the cardboard band (7) so that the portion of cardboard band (8) in flat configuration has suitable dimensions for the packaging of the plurality of articles (100).

The portion of the cardboard band (8) in the flat configuration is preferably designed with the aim of forming a containing cover of the plurality of articles (100) (FIGS. 6 and 7). Therefore the box (9) will be such as to entirely cover the plurality of articles (100).

In particular, the portion of cardboard band (8), in both the flat configuration and in the box (9) configuration, comprises a central region (8*a*) dimensioned such as to restingly receive the plurality of articles (100) and a peripheral region (8*b*) which surrounds the central region (8*a*). The peripheral region (8*b*) is perimetral with respect to the central region (8*a*) (FIGS. 6 and 7). Further, the portion of cardboard band (8) in the flat configuration can comprise a plurality of fold lines which facilitate the folding of the portion of cardboard band (8) in a flat configuration. In particular, the fold lines can comprise a fold line (80) at least at a part of the perimeter of the central region (8*a*) (FIGS. 6 and 7). For this purpose, the apparatus (10) can comprise scoring means (not illustrated) arranged upstream or downstream of the cutting means (12) with respect to the advancement direction of the cardboard band (7).

A preferred embodiment of the portion of the cardboard band (8) in the flat configuration is illustrated in FIGS. 6 and 7. The portion of cardboard band (8) comprises the rectangular central region (8*a*) and the peripheral region (8*b*) which in turn comprises: a first closing wing (81) which is hinged at a first side of the perimeter of the central region (8*a*), which is foldable towards the central region (8*a*), and which is dimensioned so as to envelop the plurality of articles (100) at least at a first flank; a second closing wing (82) which is hinged at a second side of the perimeter of the central region (8*a*), opposite the first side of the perimeter of the central region (8*a*), which is foldable towards the central region (8*a*), and which is dimensioned so as to envelop the plurality of articles (100) at least at a second flank opposite the first flank; a third closing wing (83) which is hinged at a third side of the perimeter of the central region (8*a*), which is foldable towards the central region (8*a*), and which is dimensioned so as to envelop the plurality of articles (100) at least at a third flank and for at least partially superposing the first closing wing (81) and the second closing wing (82); a fourth closing wing (84) which is hinged at a fourth side of the perimeter of the central region (8*a*), opposite the third side of the perimeter of the central region, which is foldable towards the central region (8*a*), and which is dimensioned so as to envelop the plurality of articles (100) at least at a fourth flank and for at least partially superposing the first closing wing (81) and the second closing wing (82) The fourth closing wing (84) can comprise a first portion (84*a*) which is dimensioned such as to envelop the plurality of articles (100) at least at a fourth flank and for at least partially superposing the first closing wing (81) and the second closing wing (82) and a second portion (84*b*) dimensioned so as to superiorly envelop the plurality of articles (100) and for at least partially superposing the first closing wing (81) on the second closing wing (82) and the third closing wing (83).

The apparatus (10) preferably comprises support means (16) for supporting the portion of cardboard band (8) in a flat configuration and the folding means (15) comprise: at least two folding elements (17) of which at least one is mobile and commanded by the control unit according to the data supplied by the detecting means (11); and drawing means (18) for drawing the portion of cardboard band (8) in the flat configuration, when the portion of cardboard band (8) is supported by the support means (16), against the at least two folding elements (17). The support means (16) are arranged such that the portion of cardboard band (8) in the flat configuration, when the cardboard band (8) is supported by the support means (16), is above the at least two folding elements (17); The support means (16) and the at least two folding elements (17) can be reciprocally arranged so that, when the drawing means (18) draw the portion of cardboard band (8) in the flat configuration against the at least two folding elements (17), each of the at least two folding elements (17) encounters the peripheral region (8b) of the portion of cardboard band (8) in the flat configuration so as to form the box (9).

This embodiment advantageously enables rapidly realising the box (9) starting from the portion of cardboard band (8) in a flat configuration.

The support means (16) are preferably such as to support the portion of cardboard band (8) in the flat configuration in such a way that it is horizontal.

The at least two folding elements (17) can both be mobile. The folding element (17), which is mobile (possibly both) is preferably mobile in a horizontal plane that is parallel to the portion of cardboard band (8) in the flat configuration, when the portion of cardboard band (8) in flat configuration is supported by support means (16).

The support means (16) can be the at least two folding elements (17).

The at least two folding elements (17) are preferably conformed and arranged so as to contact the peripheral region (8b) of the portion of cardboard band (8) in a flat configuration perimetrally with respect to the central region (8a).

For example, in a case where the central region (8a) of the portion of cardboard band (8) is triangular, the at least two folding elements (17) can comprise an L-shaped folding element (17) and a longitudinal mobile folding element (17). In a case where the central region (8a) of the portion of cardboard band (8) is square, the at least two folding elements (17) can comprise an L-shaped folding element (17) and two longitudinal mobile folding elements (17) or four longitudinal folding elements (17) (FIGS. 5-7) in which at least two are mobile.

The at least two folding elements (17) are preferably arranged so as to contact the peripheral region (8b) of the portion of cardboard band (8) in a flat configuration in proximity of the fold line (80) fashioned at least at a part of the perimeter of the central region (8a) of the portion of cardboard band (8) in the flat configuration.

The folding means (15) are preferably arranged at the boxing station (X) (FIGS. 4-8F). The folding of the portion of cardboard band (8) in the flat configuration so as to form the box (9) is advantageously done at the same time as the release of the plurality of articles (100) to be packed (FIG. 8C).

The apparatus (10) preferably comprises an abutting plane (19) arranged inferiorly of the at least two folding elements (17) so as to abut the central region (8a) of the portion of cardboard band (8). The abutting plane (19) is mobile and commanded by the control unit according to the data supplied by the detecting means (11) for varying the distance between the abutting plane (19) and the at least two folding elements (17).

In particular, the abutting plane (19) is arranged in accordance with the height of the volume occupied by the plurality of articles (100) in the chamber (5) of the reusable crate (1). Therefore, the greater the height the more the abutting plane (19) will be distanced from the at least two folding elements (17). The abutting plane (19) is preferably vertically mobile.

The abutting plane (19) advantageously enables further optimising the packaging of the plurality of articles (100).

In a case where the folding means (15) are arranged at the boxing station (X) the abutting plane (19) will also be arranged at the boxing station (X).

Supposing that the reusable crate (1) is according to the embodiment illustrated in the figures, the central region (8a) will be conformed as a quadrilateral (rectangle or square). In this case, the folding means (15) preferably comprise: a first folding element (17a) and a second folding element (17b) arranged reciprocally opposite and parallel to one another; a third folding element (17c) and a fourth folding element (17d) arranged opposite and parallel to one another. At least two from among the first folding element (17a), the second folding element (17b), the third folding element (17c) and the fourth folding element (17d) are mobile and commanded by the control unit according to the data supplied by the detecting means (11).

The first folding element (17a), the second folding element (17b), the third folding element (17c) and the fourth folding element (17d) can all be mobile.

The first folding element (17a) and the second folding element (17b) can be arranged superiorly of the third folding element (17c) and the fourth folding element (17d). In this case, the support means (16) are identified in the first folding element (17a) and in the second folding element (17b). The first folding element (17a), the second folding element (17b), the third folding element (17c) and the fourth folding element (17d) can each be conformed as a longitudinal cylinder (FIGS. 6 and 7).

With reference to the embodiment illustrated in the figures, the first folding element (17a) is arranged so as to contact the third closing wing (83) of the portion of cardboard band (8) in a flat configuration, the second folding element (17b) is arranged so as to contact the fourth closing wing (84) of the portion of cardboard band (8) in a flat configuration, the third folding element (17c) is arranged so as to contact the first closing wing (81) of the portion of cardboard band (8) in a flat configuration, and the fourth folding element (17d) is arranged so as to contact the second closing wing (82) of the portion of cardboard band (8) in a flat configuration.

The drawing means (18) can preferably comprise at least a pusher element (18a) arranged such as to push on the plurality of articles (100) contained in the chamber (5) of the reusable crate (1).

The at least a pusher element (18a) advantageously facilitates the drawing of the portion of cardboard band (8) in a flat configuration against the at least two folding elements (17) so as to form the box (9). In this case the at least a pusher element (18a) cooperates with the force of gravity.

In a particular embodiment, the drawing means (18) can comprise at least an aspirating element (18b) (for example a sucker) arranged inferiorly of the portion of cardboard band (8) in the flat configuration, when the portion of cardboard band (8) in the flat configuration is supported by support means (16), for aspirating the portion of cardboard band (8) in the flat configuration.

The at least an aspirating element (18b) advantageously facilitates the drawing of the portion of cardboard band (8) in a flat configuration against the at least two folding elements (17) so as to form the box (9). The at least an aspirating element (18b) cooperates with the force of gravity and, if provided, with the at least a pusher element (18a).

The at least an aspirating element (18b) is arranged and conformed so as to aspirate the portion of cardboard band (8) in the flat configuration at the central region (8a) thereof.

In an embodiment of the apparatus (10) illustrated in FIGS. 4 and 5, the cardboard band (7) can be supplied, for example, folded in bellows-fashion (alternatively it might be wound so as to form a reel of cardboard band). The cardboard band (7) is fed in an advancement direction along a relative advancement direction which is parallel to the extension direction of the cardboard band. The cutting means (12) are arranged, with respect to the advancement direction of the cardboard band, upstream with respect to the boxing station (X).

The portion of cardboard band (8) in the flat configuration is positioned at the boxing station (X) by means of a relative first conveyor (20). Still with reference to FIGS. 4 and 5, the reusable crates (1) containing the relative pluralities of articles (100) are positioned in the boxing station (X) by a second conveyor (21) and pliers (24) which pick up the reusable crate (1) from the second conveyor (21) and position it at the boxing station (X).

As in the figures, the apparatus (10) can further comprise pusher means (22) and retaining and folding means (23) (FIGS. 6-8F), which are arranged so as to act on the box (9) containing the plurality of articles (100).

The retaining and folding means (23) have a longitudinal development along a relative extension direction (Y). The pusher element (22) is arranged and activated so as to push the box (9) along the retaining and folding means (23), in particular along the extension direction (Y) of the retaining and folding means (23).

With reference to FIG. 7, the box (9) comprises a first portion (9a) for containing the plurality of articles (100) and a closing flap (9b). The first portion (9a) can be defined by the central region (8a), by the first closing wing (81), by the second closing wing (82), by at least a part of the third closing wing (83) and by the first portion (84a) of the fourth closing wing (84). The closing flap (9b) can be defined by the at least a second portion (84b) of the fourth closing wing (84). The retaining and folding means (23) are conformed so as to retain the first portion (9a) of the box (9) in the conformation assumed following the action of the folding means (15) and for folding the closing flap (9b) so that the box (9) completely envelops the plurality of articles (100) (FIG. 7). The apparatus (10) can further comprise gluing means (25) arranged at the retaining and folding means (23) for injecting glue onto the box (9) and enable fixing the closing flap (9b) to the first portion (9a).

Alternatively, according to an embodiment that is not illustrated, the box (9) can comprise only the first portion (9a) and the closure might be done using a suitable cover.

In the embodiment of the apparatus (10) illustrated in the figures, the functioning thereof will be described in the following.

With reference to FIG. 8A, the positioning means (14) (i.e. the first conveyor (20) for the portion of cardboard band (8) in the flat configuration an the second conveyor (21) and the pliers (24) for the reusable crate (1)) position the portion of cardboard band (8) in the flat configuration and the reusable crate (1) in the boxing station (X). At the same time, the control unit appropriately positions the folding elements (17a, 17b, 17c, 17d) and the abutting plane (19) in accordance with the data detected relating to the volume occupied by the plurality of articles (100). Thereafter, the movement means (13) move the bottom wall (2) of the reusable crate (1) (FIG. 8B) and the aspirating elements (18b) are positioned in proximity of the portion of cardboard band (8) in the flat configuration. Following this, the aspirating elements (18b) and the pusher elements (18a) are activated so that the portion of cardboard band (8) in the flat configuration is drawn against the folding elements (17a, 17b, 17c, 17d), up to contacting the abutting plane (19), forming the box (9) and at the same time inserting the plurality of articles (100) in the box (9) (FIGS. 8C, 8D). Then the pusher element (22) is positioned so as to contact the box (9) (FIG. 8E) and push it (FIG. 8F) along the retaining and folding means (23) in such a way as also to bend the closing flap (9b) of the box (9).

The invention claimed is:

1. A method for realizing a box starting from a cardboard band for packaging and for packing a plurality of articles within the box, comprising steps of:
   providing a reusable crate comprising an external wall, a chamber, a first internal wall, a bottom wall with a projection, the first internal wall being mobile to vary the volume of the chamber, the bottom wall being constrained to the external wall so as to be slidable along a part of an edge of the external wall so as to be disposable with respect to the external wall in a first closed position, wherein the bottom wall closes the chamber with a bottom-wall portion projecting from the external wall, and in a second open position wherein the bottom wall opens the chamber;
   arranging a plurality of articles to be packed in the chamber of the reusable crate with the bottom wall in the first closed position;
   moving the first internal wall of the reusable crate such as to minimize the volume of the chamber and, thereafter, detecting volume data on the volume of the articles within the chamber;
   cutting a cardboard band for packaging according to the volume data, obtaining a portion of cardboard band in a flat configuration comprising a central region dimensioned to restingly receive the articles contained in the chamber of the reusable crate and a peripheral region surrounding the central region;
   reciprocally positioning the portion of cardboard band and the reusable crate such that the central region of the portion of cardboard band is placed below the chamber of the reusable crate and can receive the articles from the chamber of the reusable crate when the bottom wall is moved to the second open position;
   gripping the projection of the bottom wall of the reusable crate in the first closed position and moving the bottom wall from the first closed position to the second open position to open the chamber so that the articles can be released from the chamber onto the central region of the portion of the cardboard band;
   folding the peripheral region portion of the cardboard band in the flat configuration with respect to the central region around the articles resting on the central region so as to form a box containing the articles,
   wherein the folding of the peripheral region of the portion of the cardboard band includes drawing the portion of the cardboard band towards and against two folding elements, each of the two folding elements encountering the peripheral region of the portion of the cardboard band and folding the peripheral region with respect to the central region around the articles resting on the central region so as to form the box,
   wherein the drawing of the portion of the cardboard band towards and against the two folding elements includes pushing the articles contained in the chamber against the central region of the cardboard band and thus pushing the portion of the cardboard band along with the articles towards and against the two folding elements and, simultaneously with the pushing, aspirating the central region of the portion of the cardboard band to draw the portion of the cardboard band towards and against the two folding elements.

2. The method of claim 1, wherein the step of folding the portion of cardboard band in the flat configuration comprises steps of:
- arranging an abutting plane inferiorly to the at least two folding elements so as to encounter the central region of the cardboard band;
- moving the abutting plane, according to the volume data detected as to the volume of articles, so as to vary a distance between the abutting plane and the at least two folding elements;
- the drawing of the portion of the cardboard band in the flat configuration against the at least two folding elements including drawing the portion of the cardboard band in the flat configuration up to contacting the abutting plane with the central region of the portion of the cardboard band.

* * * * *